Figure 1:
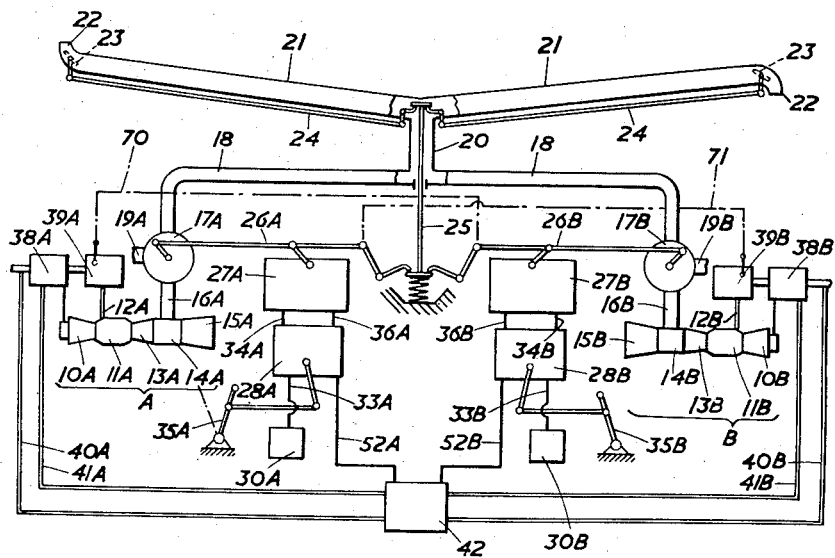

Dec. 23, 1958  J. SKELLERN  2,865,176
CONTROL SYSTEMS FOR MULTI-ENGINE AIRCRAFT
EMPLOYING REACTION JETS
Filed Dec. 12, 1956  2 Sheets-Sheet 1

INVENTOR
John Skellern
BY
Watson, Cole, Grindle & Watson
ATTORNEYS

Dec. 23, 1958  J. SKELLERN  2,865,176
CONTROL SYSTEMS FOR MULTI-ENGINE AIRCRAFT
EMPLOYING REACTION JETS
Filed Dec. 12, 1956  2 Sheets-Sheet 2

INVENTOR
John Skellern.
BY
Watson, Cole, Grindle & Watson
ATTORNEYS

United States Patent Office 2,865,176
Patented Dec. 23, 1958

2,865,176

CONTROL SYSTEMS FOR MULTI-ENGINE AIRCRAFT EMPLOYING REACTION JETS

John Skellern, Northolt, England, assignor to D. Napier & Son Limited, London, England, a British company Application December 12, 1956, Serial No. 627,760

Claims priority, application Great Britain December 14, 1955

11 Claims. (Cl. 60—97)

This invention relates to control systems for multi-engine aircraft employing reaction jets. The term "engine" is used herein to mean a unit which produces gas at a pressure suitable for discharge from one or more nozzles as a reaction jet or jets, whether this gas be air, combustion products, or a mixture thereof, and whether or not a mechanical drive is also taken from the unit. The invention is primarily concerned with certain problems which arise in such aircraft where the gas streams delivered by two or more engines enter a common duct leading to the nozzle or nozzles. The invention is applicable more particularly, but not necessarily exclusively, to multi-engined jet aircraft in which the discharge gases from the separate engines are led to one or more ducts which are fed individually by more than one engine, the collective discharge from the common duct or ducts being led to a point or points suitable for the purposes of reaction propulsion. For instance, the invention is applicable to multi-engine jet-propelled helicopters of the kind having at least one rotor driven by the reaction from jets of gas discharged through nozzles at or near the tips of the rotor blades.

According to the present invention, in a control system for a multi-engine aircraft employing reaction jets and in which the gas streams delivered by two or more engines enter a common duct leading to a nozzle or nozzles, there is a device sensitive to a difference in the gas discharge conditions between the two or more engines (e. g. to a difference in the speeds of the engines) and which is arranged automatically to isolate from the common duct an engine of which the regulating parameter to which the device is sensitive alters by a predetermined amount from the value given by the remaining engine or engines (e. g. an engine whose speed falls to a predetermined extent below that of the remaining engine or engines).

Thus, in the event of complete or partial failure of one of the engines this engine is immediately isolated from the common duct to prevent leakage of gas from the duct back through this engine.

In one form of the invention each engine drives a rotary member which generates a fluid pressure which is a function of the speed of rotation of the engine, and a device is provided which balances these pressures against each other and which is moved, in the event of an unbalance in these pressures (representing a difference in the rotational speeds of the engines), to influence hydraulic actuating mechanism for an isolating valve which isolates from the common duct the engine responsible for this unbalance. The said device, in the event of an unbalance in engine speeds, may be arranged to actuate a trigger valve associated with the engine responsible for the unbalance and which, when actuated, reverses the position of a changeover valve controlling a servomotor which actuates the isolating valve of this engine.

Preferably, there is also for each engine a manual control for reversing the position of the changeover valve in the direction serving to isolate this engine from the common duct and operative independently of the said device responsive to an unbalance in engine speeds.

It is desirable in the hydraulic system to provide a hydraulic accumulator associated with each servomotor and containing sufficient hydraulic fluid under pressure to actuate the servomotor promptly in the event of reversal of the changeover valve. Thus the hydraulic system can be caused to operate a relatively large servomotor while yet employing a pump of relatively small capacity.

Preferably the control system also includes means whereby, in the event of isolation of an engine as aforesaid, the remaining engine is, or the remaining engines are, automatically adjusted to produce a higher output to compensate partially for the reduction in available power caused by the said isolation of an engine.

The control system is also applicable to the starting-up of turbine engines whose discharge enters a common duct. Thus the engine to be started is isolated from the common delivery duct during the running-up process. When its speed, or other suitable regulating parameter, is within a predetermined amount of that required to give stability when connected to the common duct, the isolating valve is automatically operated so that this engine delivery is brought into the common duct without upsetting the equilibrium of the engines already delivering their gases to it, and at the same time the final discharge or propelling nozzle is increased in area to allow for the additional mass flow.

Figure 2:
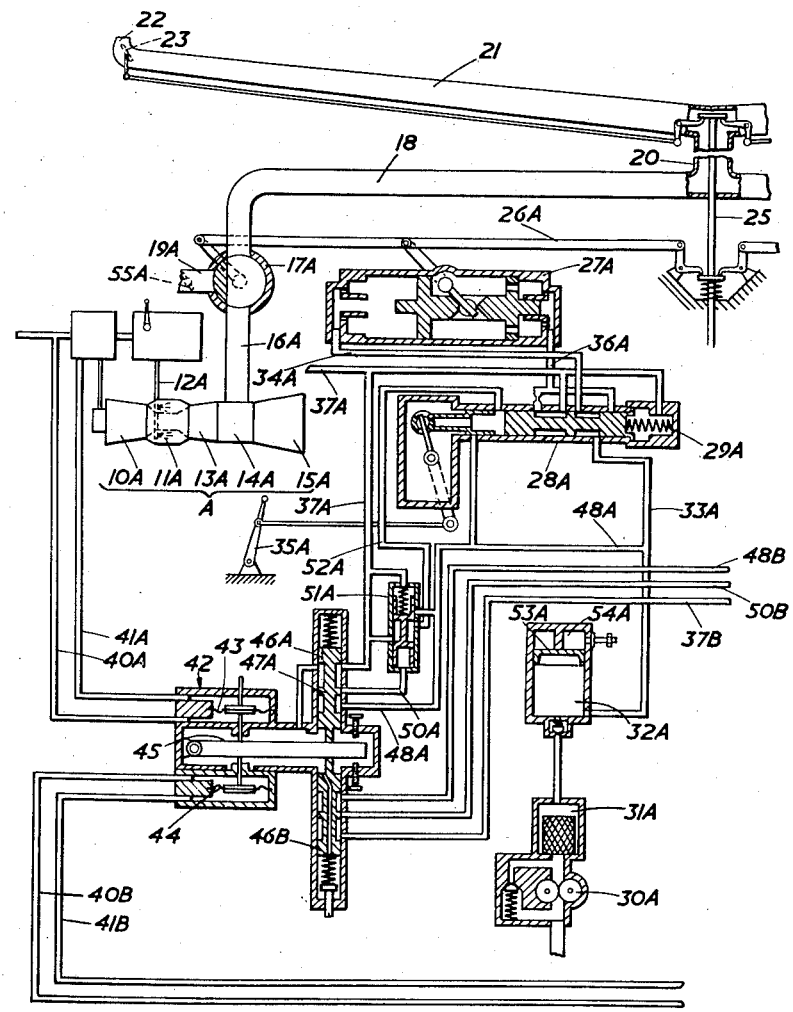

The invention may be performed in various ways and one particular embodiment, applied to a multi-engine jet-propelled helicopter, will now be described by way of example with reference to the accompanying diagrammatic drawings, in which:

Figure 1 is a general block diagram of the working parts of the helicopter and its control system; and Figure 2 shows in more detail certain of the parts illustrated in a skeleton manner in Figure 1.

The multi-engine jet-propelled helicopter shown in the drawings has two gas turbine engines A and B. Parts that are identical for the two engines are designated with the same reference numeral, with the suffix A or B as the case may be. For brevity the invention will be described more particularly in relation to the engine A and its associated parts, and it will be understood that such description will be applicable also to the corresponding parts of engine B.

The engine A is a gas turbine engine having a main compressor 10A which draws in air from the atmosphere and delivers it into a combustion chamber or chambers 11A wherein is burnt fuel supplied through a pipe 12A. The hot combustion gases are expanded in a turbine 13A and then enter a mixing chamber 14A. The turbine 13A drives the main compressor 10A and also drives an auxiliary compressor 15A. The auxiliary compressor 15A draws in air from the atmosphere and discharges it into the mixing chamber 14A wherein it is mixed with the turbine exhaust gases. The mixed gases then pass through a pipe 16A to an isolating valve 17A and thence, depending upon the setting of the valve 17A, either into a duct 18 common to the two engines A and B or to the atmosphere through an outlet pipe 19A. The common duct 18 has an upwardly-extending trunk 20 leading to the hollow blades 21 of the helicopter rotor. Since the rotor is rotatable and the lower parts 18 of the common duct are stationary, the trunk 21 includes glands or seals (not shown) to permit relative rotation between its upper and lower parts without appreciable escape of gas. At the tip of each rotor blade 21 there is a discharge nozzle 22 directed rearwardly with respect to the rotor blade so that the reaction of the jet of gas discharged through the nozzle causes the helicopter rotor to rotate. Each nozzle 22 is provided with a device 23 for adjusting its flow cross-section either into a large area condition or a small area condition. These nozzle-adjusting devices are controlled through a linkage system 24 from a common actuating member 25 which is in turn connectable through linkage systems 26A and 26B to the isolating valves 17A and 17B and to servomotors 27A and 27B associated respectively with the engine A and the engine B. Considering the engine A, the linkage 26A not only serves to actuate the common actuating member 25 in response to movements of the servomotors 27A but also connects the isolating valve 17A with this servomotor so that when the isolating valve 17A is in the normal position as shown in Figure 2 the nozzles 22 are in their large area condition, whereas when the isolating valve 17A is in the isolating position, that is to say when the pipe 16A is connected to the outlet pipe 19A so that the engine A is isolated from the common duct 18, the nozzles are in the small area condition. Both the linkages 26A and 26B influence the common actuating member 25 so that the nozzles 22 are set into their small area condition whenever either the valve 17A or the valve 17B is turned into its isolating position.

The position of the servomotor 27A is determined by the position of a main shuttle valve 28A, this valve being normally urged to the left in Figure 2 by a spring 29A so that hydraulic fluid which is maintained under pressure by a pump 30A is in communication through a filter 31A, a hydraulic pressure accumulator 32A and pipes 33A and 34A with the left-hand cylinder space of the servomotor 27A whereby the piston of this servomotor is urged to the right to hold the isolating valve 17A in its normal position as shown in the drawing. For the engine A there is a control lever 35A which can be actuated by the pilot to move the shuttle valve 28A to the right against the action of the spring 29A for cutting off communication between the pipes 33A and 34A and opening communication between the pipe 33A and a pipe 36A leading to the right-hand end of the servomotor 27A. At the same time the pipe 34A is brought into communication with a drain pipe 37A. Thus, by moving the control lever 35A so as to force the shuttle valve 28A to the right, the pilot can at will actuate the isolating valve 17A to isolate the engine A from the common duct 18 and simultaneously set the rotor nozzles 22 into their small area condition. On the other hand, when the shuttle valve 28A is held in its right-hand end position by hydraulic pressure in a manner to be described, the control 35A is inoperative to return the shuttle valve 28A towards the left. Thus although the pilot can at will isolate either engine from the common duct, he cannot connect an engine to the common duct unless the automatic control system is in a condition permitting this, nor can the automatic control system re-connect an engine to the common duct unless the appropriate pilot's control lever 35A or 35B is in a position permitting this.

Fuel for the engine A is pumped by an engine-driven fuel pump 38A to a fuel metering unit 39A and thence to the combustion chambers 11A through the pipe 12A. The fuel pump 38A is of the kind which produces a pressure differential between a low pressure pipe (pump inlet pressure) 40A and a high pressure pipe (inlet pressure plus centrifugal head) 41A. These pressures, and the corresponding pressures from the engine B are supplied to a device 42 sensitive to any unbalance between the pressure differences on the one hand in the pipes 41A and 40A and on the other hand in the pipes 41B and 40B, that is to say the device 42 constitutes a differential speed-sensing device for the two engines.

The differential speed-sensing device 42 is shown in more detail in Figure 2. It comprises an upper diaphragm 43 across which is applied the pressure difference between the pipes 41A and 40A, and a lower diaphragm 44 across which is applied the pressure difference between the pipes 41B and 40B. The diaphragms 43 and 44 act through pins in opposite directions upon a lever 45. This lever is pivoted at its left-hand end as shown in Figure 2, and near its right-hand end it is engaged between an upper trigger valve 46A and a lower trigger valve 46B. These valves are loaded by springs which tend to maintain the lever 45 in an equilibrium position, and it will remain in this equilibrium position when the resultant forces acting upon the diaphragms 43 and 44 are balanced.

Considering the trigger valve 46A, this is provided with a central land 47A the space beneath which communicates with a pipe 48A which in turn communicates with the pipe 33A and is therefore continually supplied with hydraulic fluid under pressure. The land 47A normally obstructs the entrance to a pipe 50A leading to the underside of an auxiliary shuttle valve 51A.

Should the speed of the engine A fall below that of engine B, the pressure difference between the pipes 41A and 40A will decrease, thereby reducing the resultant downward force upon the diaphragm 43 and causing the lever 45 to be swung upwards. This raises the trigger valve 46A, and when it has been raised but a short distance the pipe 48A is brought into communication with the pipe 50A, thereby raising the auxiliary shuttle valve 51A. The raising of this valve immediately establishes communication between the pipe 48A and a pipe 52A which leads to the left-hand side of the main shuttle valve 28A. Since the pipe 48A contains and is supplied with fluid under pressure, the main shuttle valve 28A is forced to the right, thereby causing the piston of the servo motor 27A to move to the left as previously described, to isolate the engine A from the common duct 18 and set the nozzles 22 in the small area condition. The shuttle valves 51A and 28A ensure that the change-over of the servo motor 27A from one end position to the other is effected sharply and prevents indecisive movements of the servo motor.

The function of the accumulator 32A, which consists of a vessel containing a piston 53A with a compressed air space 54A above it, is to contain beneath the piston 53A sufficient fluid under pressure to fill the servo motor when the piston thereof moves from one end position to the other, to ensure a rapid change-over without requiring an excessively large pump 30A.

The lower trigger valve 46B communicates with corresponding parts associated with the engine B through pipes 48B, 50B and 37B.

When an engine, for instance the engine A, has been isolated from the common duct 18 by actuation of the servo motor 27A, either manually by the control lever 35A or automatically by the differential speed-sensing device 42, the gas that continues to be delivered by the engine A will be discharged to the atmosphere through the outlet pipe 19A. This pipe includes a throttle valve 55A which is adjusted so that the resistance to the flow of the gas emerging through the outlet pipe 19A is approximately the same as the resistance to the flow of the gas through the common duct 18, the rotor blades 21 and the nozzles 22. Thus, the movements of the isolating valve 17A do not significantly affect the back pressure against the gas discharged from the engine. This has the advantage that if, for instance, the engine B is already running connected to the common duct 18 and the engine A is started with the isolating valve 17A in its isolating position, and when the engine A has been run up to the same speed as the engine B the isolating valve 17A is turned to its normal position, virtually no shock or suddenly increased load is imposed upon the engine A. Conversely, when an engine is disconnected from the common duct there is no sudden reduction in load which might cause it to overspeed.

The discharge opening of the outlet pipe 19A is so disposed that the gas discharged from it does not produce an unwanted movement on the aircraft. For instance, the opening may face vertically upwards or downwards.

There is an interconnection 70 between the linkage 26B of the engine B and the fuel metering unit 39A of the engine A. There is likewise a similar interconnection 71 between the linkage 26A of the engine A and the fuel metering unit 39B of the engine B. The purpose of the interconnecting linkages 70 and 71 is automatically to increase the output of one engine when the other engine is isolated from the common duct, so that in the event of a sudden failure of one engine in flight the other engine will immediately be set to produce an emergency high output so as to minimize the effect of the engine failure upon the performance of the aircraft.

What I claim as my invention and desire to secure by Letters Patent is:

1. A control system for an aircraft comprising at least two engines, gas discharge ducts respectively from said engines, means driven by each of said engines for producing an operating value which is proportional to the gas output of this engine through its said duct, a common duct with which said discharge ducts communicate, at least one propulsion nozzle connected to said common duct, an isolating valve in each of said discharge ducts, a movable valve member in each said isolating valve, each said movable valve member having a normal position in which the associated engine is connected to said common duct and an isolating position in which said associated engine is isolated from said common duct, a servo control mechanism for each engine, a device sensitive to said operating values connected to all of said engines and operative in the event of a predetermined drop in the magnitude of said operating value of any one of said engines below the operating value of any other of said engines, and connections between said sensitive device and said servo control mechanisms, said device being operative to actuate the servo control mechanism of said one engine to move the movable valve member of the isolating valve thereof into said isolating position responsive to said drop in the magnitude of its operating value.

2. A control system according to claim 1 in which each said servo control mechanism includes a trigger valve actuated by said sensitive device when said sensitive device is operative responsive to a predetermined drop in the magnitude of said operating value of the engine to which said servo control mechanism belongs, a change-over valve and a servo motor controlled by said change-over valve, actuation of said trigger valve serving to reverse the position of said change-over valve to actuate said servo motor.

3. A control system according to claim 2 in which there is for each engine a manual control, means connecting said manual control with said change-over valve whereby said manual control can move said change-over valve independently of said trigger valve.

4. A control system according to claim 2 in which each servo motor has associated with it a hydraulic accumulator containing sufficient hydraulic fluid under pressure to actuate said servo motor in the event of reversal of said change-over valve.

5. A control system according to claim 1 having two engines, a fuel metering device for each engine and interconnections between each said fuel metering devices and the isolating valve of the other engine, whereby, in the event of movement of the movable member of an isolating valve into said isolating position, the fuel metering device of said other engine is automatically adjusted to produce a higher power output from this engine.

6. A control system for an aircraft comprising at least two engines, gas discharge ducts from said engines, means driven by each of said engines for producing an operating value which is proportional to the speed of said engine, a common duct with which said discharge ducts communicate, at least one propulsion nozzle associated with said common duct, an isolating valve in each of said discharge ducts, a movable valve member in each said valve, each said member having a normal position in which the associated engine is connected to said common duct and an isolating position in which said associated engine is isolated from said common duct, a servo control mechanism operatively connected to each engine, a device sensitive to said engine speeds connected to all of said engines and operative in the event of a difference in the speeds of said engines, and connections between said speed-sensitive device and said servo control mechanisms, whereby in the event of the speed of one engine falling by a predetermined amount below the speed of another engine said speed-sensitive device actuates the servo control mechanism of said one engine to move the valve member of the isolating valve thereof into said isolating position.

7. A control system according to claim 6 in which there is associated with each engine a rotary member driven by said engine, said rotary member generating a fluid pressure which is a function of the speed of rotation of said engine, and in which said speed sensitive device balances said fluid pressures against each other and is adapted in the event of an unbalance in said fluid pressures to actuate the servo control mechanism of the engine responsible for said unbalance.

8. A control system according to claim 7 in which each said servo control mechanism includes a trigger valve adapted to be actuated by said speed sensitive device in the event of a predetermined drop in speed of the engine with which said servo control mechanism is associated, a change-over valve and a servo motor controlled by said change-over valve, actuation of said trigger valve serving to reverse the position of said change-over valve to actuate said servo motor.

9. A control system according to claim 8 in which there is for each engine a manual control, means connecting said manual control with said change-over valve whereby said manual control can move said change-over valve independently of said trigger valve.

10. A control system according to claim 8 in which each servo motor has associated with it a hydraulic accumulator containing sufficient hydraulic fluid under pressure to actuate said servo motor in the event of reversal of said change-over valve.

11. A control system according to claim 6 having two engines, a fuel metering device for each engine and interconnections between each said fuel metering device and the isolating valve of the other engine, whereby, in the event of movement of said valve member of either isolating valve into said isolating position, the fuel metering device of said other engine is automatically adjusted to provide a higher power output from this engine.

No references cited.